C. SOLTÉSZ.
CULTIVATING MACHINE.
APPLICATION FILED JAN. 13, 1908.
899,917.
Patented Sept. 29, 1908.
3 SHEETS—SHEET 2.
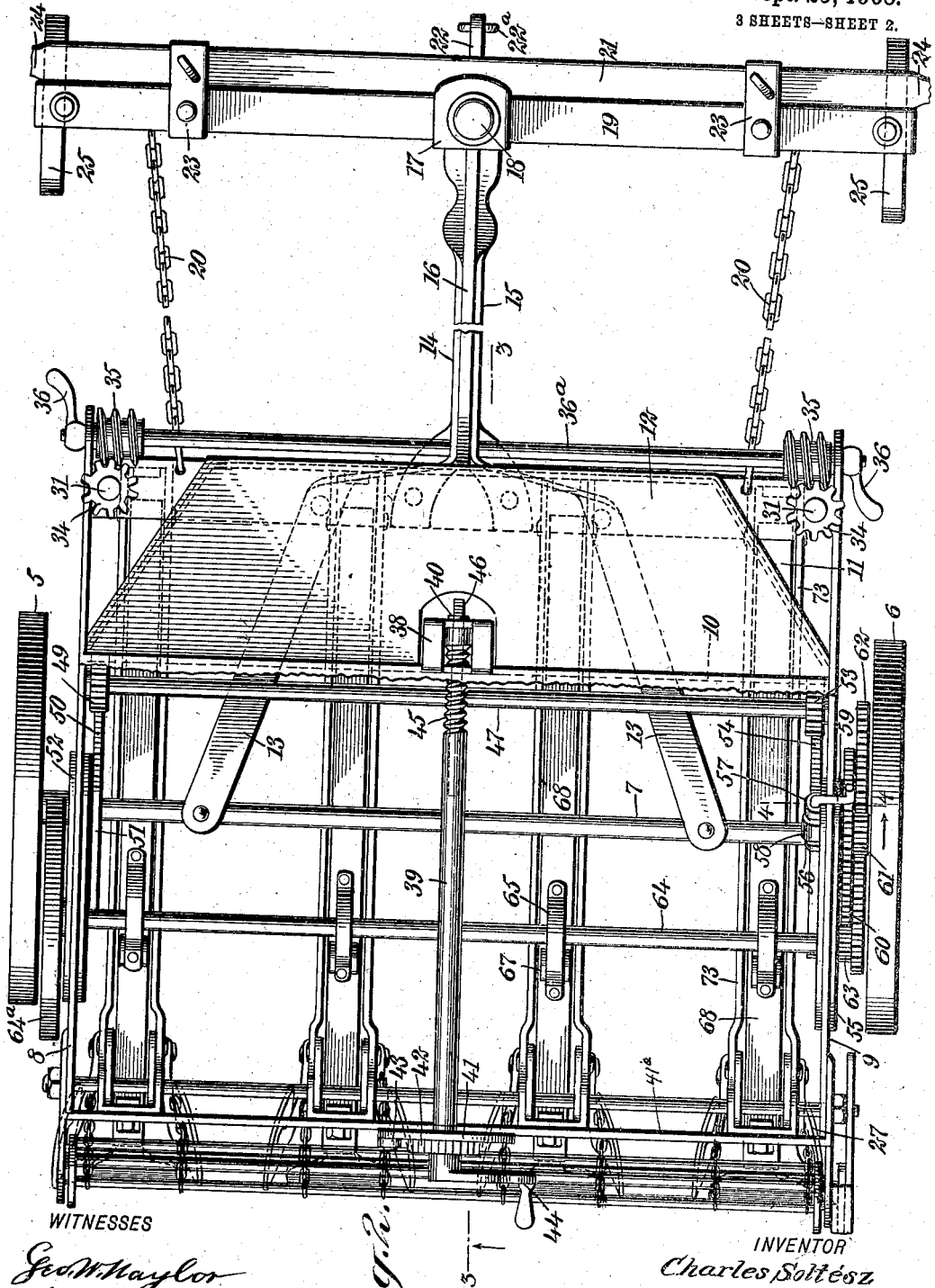
WITNESSES
Geo. W. Naylor
Walton Harrison
INVENTOR
Charles Soltész
BY Munn & Co
ATTORNEYS

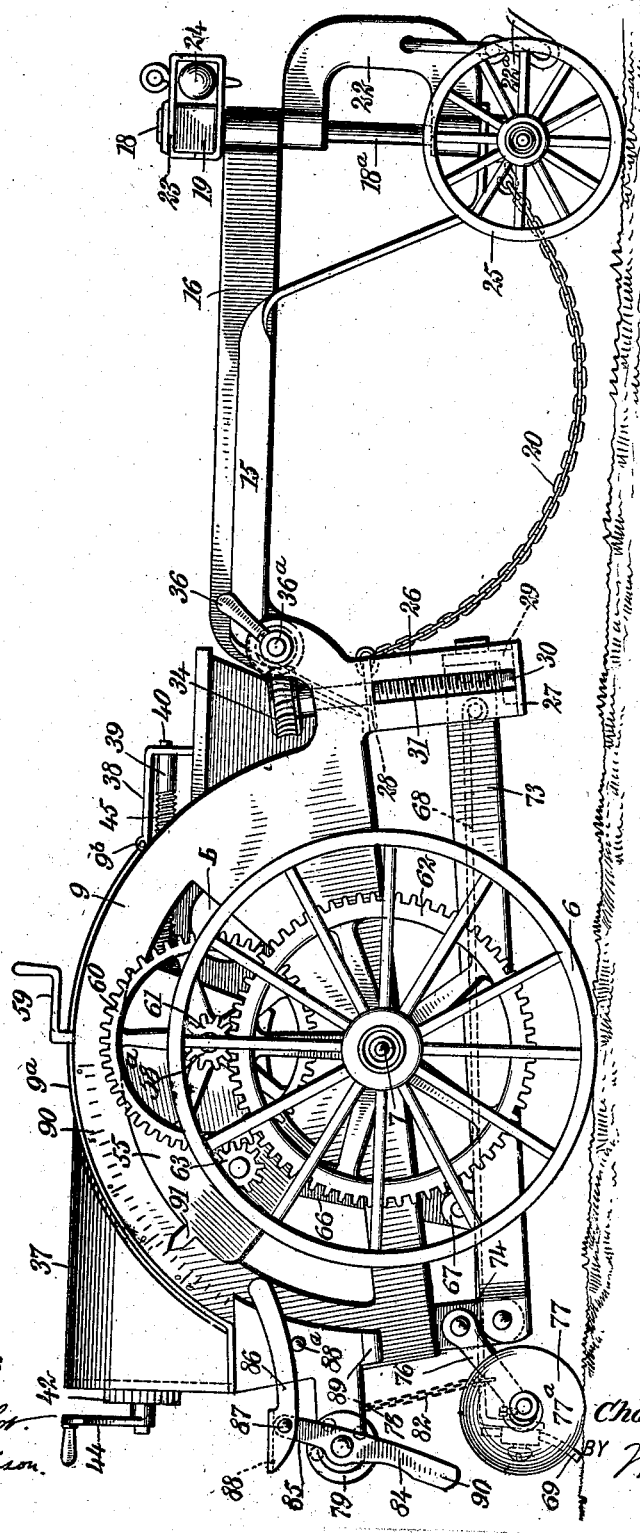

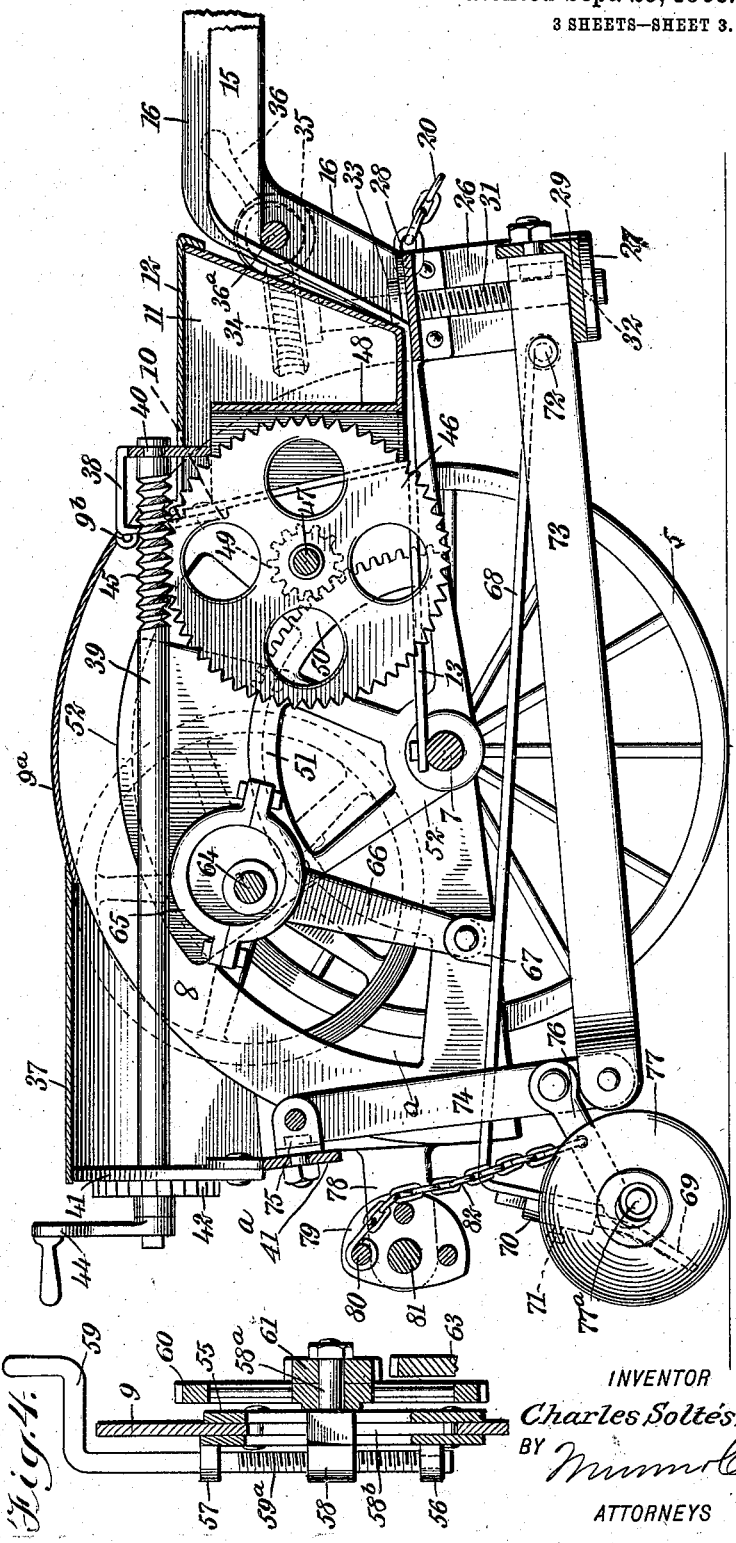

UNITED STATES PATENT OFFICE.

CHARLES SOLTÉSZ, OF NEW YORK, N. Y.

CULTIVATING-MACHINE.

No. 899,917.　　　Specification of Letters Patent.　　　Patented Sept. 29, 1908.

Application filed January 13, 1908. Serial No. 410,589.

*To all whom it may concern:*

Be it known that I, CHARLES SOLTÉSZ, a subject of the King of Hungary, and a resident of the city of New York, borough of Manhattan, in the county and State of New York, have invented a new and Improved Cultivating-Machine, of which the following is a full, clear, and exact description.

My invention relates to cultivating machines, my more particular object being to produce certain improvements in the type of cultivating machine usually drawn by animals.

Reference is to be had to the accompanying drawings forming a part of this specification, in which similar characters of reference indicate corresponding parts in all the figures.

Figure 1 is a side elevation of my harvesting machine complete, showing the framework mounted upon the wheels, the revoluble disks movably mounted upon the rear of the framework, and the hoes adapted to be raised and lowered periodically for the purpose of cutting the ground, this view further showing means for adjusting various parts; Fig. 2 is a plan partly broken away, and showing the relative arrangement of the disks and hoes, together with means for actuating the same, and further showing the means for disconnecting the gearing from the main shaft, so as to allow the operating mechanism to be idle while the machine is dragged forward; Fig. 3 is a substantially central vertical section, on the line 3—3 of Fig. 2, showing the reel for lifting the disk cutters from the ground and also showing the eccentrics for operating the hoes, and the screw mechanism, and gearing connected therewith under manual control of the operator for raising and lowering the general positions occupied by the hoes, without varying the length of vertical stroke thereof; and Fig. 4 is an enlarged sectional view on the line 4—4 of Fig. 2, showing the hand-operated screw, slide and pinion used for disconnecting certain parts from the main drive.

Wheels 5 and 6 rest upon the ground and perform the office of vehicle wheels inasmuch as they support a portion of the weight of the entire structure. These wheels are connected together by a fixed axle 7 extending entirely through the framework. Side plates 8, 9, each of a general arcuate form and having arc slots $a$ and $b$ respectively concentric with the axle, (see Fig. 1) are connected together by a plate 10 extending practically across the entire machine. In front of these plates is a compartment 11 covered by a door 12 which may be opened and closed at will. The compartment 11 constitutes a box for tools used in connection with the various parts of the machine.

Braces 13 of metal are secured to the axle 7 and extend forwardly and upwardly, being provided with parallel portions 14, 15 which are lapped upon opposite sides of a central beam 16. This beam is provided with a head 17 through which passes a bolt 18. This bolt is provided with a comparatively long portion $18^a$ and extends through a wooden beam 19. Connecting this wooden beam 19 with the framework are two chains 20, and immediately in front of the wooden beam 19 is another wooden beam 21. A clevis is shown at 22 and is provided with a hook $22^a$. This clevis swings freely upon the bolt $18^a$. Braces 23 encircle the beams 19, 21 and hold the same rigidly together. The beam 21 terminates in handles 24 which may be grasped by the operator as he walks alongside the vehicle, the latter being in motion, so that by slightly turning the beam 21, and with it the beam 19, all upon the pin 18 as a center, he may guide the machine.

The front wheels are shown at 25. The side plates 8, 9 are provided with downwardly extending portions 26 (see Fig. 1), and connecting these downwardly extending portions together are cross plates 27, 28 (see lower right-hand corner of Fig. 3). The downwardly extending portions 26 together constitute a vertical slideway, and slidably mounted therein is a cross bar 29, this cross bar being provided at its ends with lugs 30 (see Fig. 1) which extend directly through the side plates 26, the latter being slotted for this purpose.

Two revoluble screws 31 are each provided at the lower end with a pivot 32 which works in the plate 27 as a bearing. Each screw is further provided with a bead 33 rigid upon it and extending above the plate 28 through which the two screws 31 pass. Each of these screws is provided at its upper end with a worm wheel 34 which meshes with a worm 35. These worms are controllable by handles 36 and to this end both worms 35 and both handles 36 are mounted rigidly upon a single shaft $36^a$. By turning either handle 36 the shaft 36ᵃ is rotated, the screws 31 are turned, and the bar 29 raised or lowered, as the case may be. The friction of the worms and worm wheels is sufficient to retain the bar at any elevation to which it may be raised or lowered.

A cover 9ᵃ of sheet metal is pivotally mounted upon the framework at 9ᵇ and is provided with a hood 37 extending to the rear. A fixed bracket 38, integral with the plate 10 and bent forwardly and downwardly therefrom, supports one end of a revoluble shaft 39, the latter being provided with a pivot 40 which works in the bracket 38 as a bearing. A fixed plate 41 supports the opposite end of the shaft 39. This plate is mounted rigidly upon a cross bar 41ᵃ, which extends practically the full width of the machine and connects together the side plates 8 and 9. Mounted rigidly upon the shaft 39 is a ratchet wheel 42 which is engaged by a pawl 43, as will be understood from Fig. 2. A hand crank 44 is mounted rigidly upon the shaft 39. By turning the hand crank the shaft is rotated, and undesirable backward rotation is prevented by the pawl. By lifting the pawl by hand, the shaft may be turned backward.

The shaft 39 is provided with a threaded portion 45 which meshes with a gear wheel 46, the latter being mounted rigidly upon the shaft 47, which is journaled in bearings carried by the side plates 8 and 9. A guard 48 is mounted within the tool box and partially encompasses the gear 46, so as to prevent contact therewith of articles disposed within the tool box.

Rigidly mounted upon the revoluble shaft 47 is a pinion 49 which meshes with a toothed sector 50 having a smooth portion 51. This sector is rigidly secured to a sector frame 52, which extends on opposite sides of the plate 8 at the slot thereof and is movable relatively to the said plate, being adapted to swing upon the stationary axle 7 as a center. Upon the opposite side of the machine the arrangement is somewhat similar to that just described. A pinion 53 is rigidly mounted upon the shaft 47 and meshes with a toothed sector 54, this sector being substantially like the one just described and being rigidly connected with a sector frame 55 which swings upon the shaft 7. The side plates 8, 9, the plate 10, and the cross bar 41ᵃ together practically constitute the main frame. The toothed sectors 50, 54, being journaled upon the shaft 7, are at their outer circumference slidable in relation to the side plates 8, 9, the upper portions of the latter being of arcuate conformity and the sectors fitting against the under surfaces of these portions. For this purpose each of the two sectors comprises two plates spaced apart and disposed at opposite sides of the adjacent side plates 8, 9.

Mounted upon the sector frame 55 are bearings 56, 57 (see Fig. 4) and disposed intermediate these bearings is a slide 58 carrying a stub shaft 58ᵃ and working in the slot $b$ of the side plate 9 and in a slot 58ᵇ in the sector frame. A hand crank 59 is integrally connected with a screw 59ᵃ, this screw being journaled in the bearings 56, 57. By turning the screw the slide 58 is raised or lowered, moving along the slot 58ᵇ, as will be understood from Fig. 4. A gear wheel 60 and a gear pinion 61 are both mounted rigidly upon the stub shaft 58ᵃ, and consequently are moved bodily whenever the slide 58 is moved by the action of the screw. Meshing with the pinion 61 is a gear 62 (see Fig. 1), this gear being mounted upon one end of the axle 7. A pinion 63 is mounted upon one end of a revoluble shaft 64 whch extends practically across the entire frame and is provided at its other end with a balance wheel 64ᵃ. This shaft 64 is mounted upon the sector frames 52 and 55 and carries four eccentrics 65 and extending obliquely downward from these eccentrics are eccentric rods 66 (see Fig. 3) which engage lugs 67 mounted upon swinging levers 68. Each of these levers carries a hoe 69, and for this purpose is bent substantially into an L-shape and is provided with a bracket 70 secured rigidly upon it and also provided with a set screw 71.

By turning the set screw 71 the hoe 69 may be loosened and adjusted relatively to the lever 68, and then clamped rigidly in place by turning the set screw in the opposite direction. The levers 68 are mounted upon pivots 72 extending between adjacent bars 73. These bars are of metal and rest upon their edges, being arranged in pairs, as indicated in Fig. 2, and at their forward ends connected with the cross bar 29. Each lever 68 is disposed between a pair of the bars 73, and each bar 73 is pivoted at its rear end upon a swinging bar 74, the latter being journaled upon a bracket 75 supported rigidly upon the cross bar 41ᵃ.

A link 76 is pivotally mounted upon each bar 74 and extends rearwardly and downwardly therefrom. A cutter disk 77 is mounted upon each link 76, the latter being provided with a stub shaft 77ᵃ for this purpose. I do not limit myself, however, to this arrangement, for the reason that various changes may be made in the form of the link 76 and of the type of cutter carried by it. So, also, the proportions of the several parts may be varied at will and the cutter disks may be made of different sizes and rendered interchangeable.

A pair of fixed brackets 78 are mounted upon opposite sides of the framework, being secured directly to the forwardly bent portion of the cross bar 41ᵃ. Disposed adjacent to these brackets are heads 79 connected together by rods 80, these rods extending nearly the width of the entire machine. A shaft 81 connects these heads 79 together and is journaled within the brackets 78. The rods 80, shaft 81 and heads 79 together constitute a reel. Partially wound upon this reel are chains 82 which extend downwardly from the reel and engage the links 76. By turning the reel the links 76 may be caused to swing upwardly, and this action raises the cutter disks 77 from the ground or gages the depth of the cut made by them, as the case may be, depending upon the degree to which the reel is turned.
To facilitate turning the reel I connect rigidly with it a lever 84 (see left of Fig. 1). This lever 84 is provided with a portion 85 projecting above the reel. I mount a hand lever 86 upon this portion by aid of a pivot
87. This hand lever is provided with a lug 88 which engages the portion 85 when the hand lever 86 is thrown upwardly and toward the left, according to the view shown in Fig. 1. A stop pin 88ª supports the lever 86 when the latter occupies its normal position.

In order to turn the reel the operator grasps the free end of the hand lever 86 and carries it upward, so as to carry the lug 88 into engagement with the portion 85 of the lever 84. Then, by pressing still further in the same direction, the reel is turned and the links 76 and cutter disks 77 are raised to any desired extent. A hook 89 is disposed very close to the path of travel of a portion 90 of the lever, this portion being made comparatively sharp. The operator now presses the portion 90 in a lateral direction, so as to cause it to engage the hook 89 and prevent backward rotation of the reel, and thus cause the cutter disks to remain suspended at any desired height permitted by the limits of movement of the reel.

Whenever the operator desires to change the general position occupied by the hoes, he turns the hand crank 44. This causes the rotation of the shaft 39 and the threaded portion 45 of the shaft thereupon turns the gear 46 and the shaft 47 as above described.
Pinions 49, 53 being thus turned and meshing with the toothed sectors 50, 54 cause these sectors and the sector frames 52, 55 to turn upon the shaft 7 as a center, this action being explained above. Since the shaft 64 is mounted rigidly upon the sector frames 52, 55, it is movable bodily therewith, and consequently, when it is raised or lowered, the eccentrics 65, eccentric rods 66 (see Fig. 3) and levers 68 are likewise raised or lowered. This movement is properly an adjustment as it is independent of the means for actuating the levers 68 in the sense of causing them to drive the hoes 69 into the ground. The operator, by turning the handle 44, thus raises the rear ends of the levers 68 to any desired height, either completely preventing the hoes 69 from touching the ground under any condition, or merely adjusting the elevation of the general zone of activity of the hoes, as desired. The chopping motion is given to the hoes 69 by the action of the eccentrics 65 and eccentric rods 66 upon the levers 68. The eccentrics are actuated by the rotation of the shaft 64, this being accomplished by the turning of the pinion 63 from the gear wheel 60, which, as above explained, is driven along with the pinion 61 by rotation of the gear wheel 62 (see Fig. 1). The gear wheel 62 is rigid relatively to the vehicle wheel 6 and always turns with it. The operator, by turning the hand crank 59 again (see Fig. 4), can disconnect the wheel 60 from the pinion 63 and at the same time disconnect the pinion 61 from the gear wheel 62. In doing this he destroys all operative connection from the vehicle wheel 6 to the shaft 64 carrying the eccentrics. Such being the case, the motion of the levers 68 is stopped completely.

From the above description it will be seen that the cutter disks may be raised or lowered independently of the hoes; that the hoes may be raised or lowered independently of whether the gearing is in action; and that the gearing for operating the hoes may be connected with a wheel of the vehicle and disconnected therefrom at will. It will also be seen that the front ends of the levers 68 may be raised and lowered at will.

In order to indicate the positions occupied by the sectors and sector frames, I provide a graduated scale 90 disposed in arcuate form upon the side plate 9, and I also provide the sector frame 55 with a pointer 91. The operator, by glancing at the relative position of the pointer 91 and graduated scale 90, can determine the condition of elevation or depression of the hoes.

My device is used as follows: By aid of the hook 22ª and clevis 22 the machine is drawn along over the field, preferably by aid of animals. The operator walks alongside the machine and may at any time grasp either of the handles 24. By manipulating this handle he guides the general direction of travel of the machine. The cutter disks 77 are lowered, if he desires to use the machine as a disk harrow, and the hoes are lowered and thrown into operation if he desires to chop the ground in addition to the work done by the cutter disks. When the operator so desires, he lifts the hoes or the cutters, or both the hoes and the cutters, out of engagement with the ground. He adjusts the depth of cut of the hoes, or the depth of cut of the cutter disks, or the depth of cut of both the hoes and the cutter disks, as above described. When ready to return home, he raises the cutter disks and the hoes out of possibility of engaging the ground, and disconnects the gearing by aid of the handle 59, as above described.

Having thus described my invention, I claim as new and desire to secure by Letters Patent:

1. In a cultivating machine, the combination of a body portion mounted upon wheels, disk cutters connected with said body portion and movable in relation thereto, said disk cutters being arranged in pairs, a lever disposed intermediate the cutters of each pair, a hoe mounted upon said lever, and mechanism controllable by the motion of the machine for actuating said hoe.

2. In a cultivating machine, the combination of a body portion mounted upon wheels, guide bars mounted upon said body portion, a slide connecting said guide bars together, means for adjusting said slide, levers disposed intermediate said guide bars, hoes connected with said levers, and means controllable by the motions of the machine for actuating said hoes.

3. The combination of a body member mounted upon wheels, links connected with said body member, cutter disks mounted upon said links and revoluble relatively to the earth when dragged thereover, means for raising said links for the purpose of controlling the height of said cutter disks relatively to the ground, levers supported by said body member, hoes mounted upon said levers, and mechanism controllable by the motions of said wheels for actuating said hoes.

In testimony whereof I have signed my name to this specification in the presence of two subscribing witnesses.

CHARLES SOLTÉSZ.

Witnesses:
THEODORE GOIBORSKY,
TONORZ SOLTÉSZ.